(No Model.)

J. V. BROWN & B. R. NEAL.
Stock Car.

No. 234,953. Patented Nov. 30, 1880.

WITNESSES:
Chas. Nida.
C. Sedgwick

INVENTOR:
J. V. Brown
B. R. Neal
BY
ATTORNEYS.

UNITED STATES PATENT OFFICE.

JAMES V. BROWN AND BENJAMIN R. NEAL, OF DE SOTO, ILLINOIS.

STOCK-CAR.

SPECIFICATION forming part of Letters Patent No. 234,953, dated November 30, 1880.

Application filed October 14, 1880. (No model.)

*To all whom it may concern:*

Be it known that we, JAMES V. BROWN and BENJAMIN R. NEAL, of De Soto, in the county of Jackson and State of Illinois, have invented a new and Improved Stock-Car, of which the following is a specification.

The object of this invention is to construct a car for transporting cattle and other live stock, so that the car can readily be divided into two or more stalls, and the live stock be more easily gotten in and out therefrom, and the food and water be more conveniently transported and fed to the animals.

Figure 1:
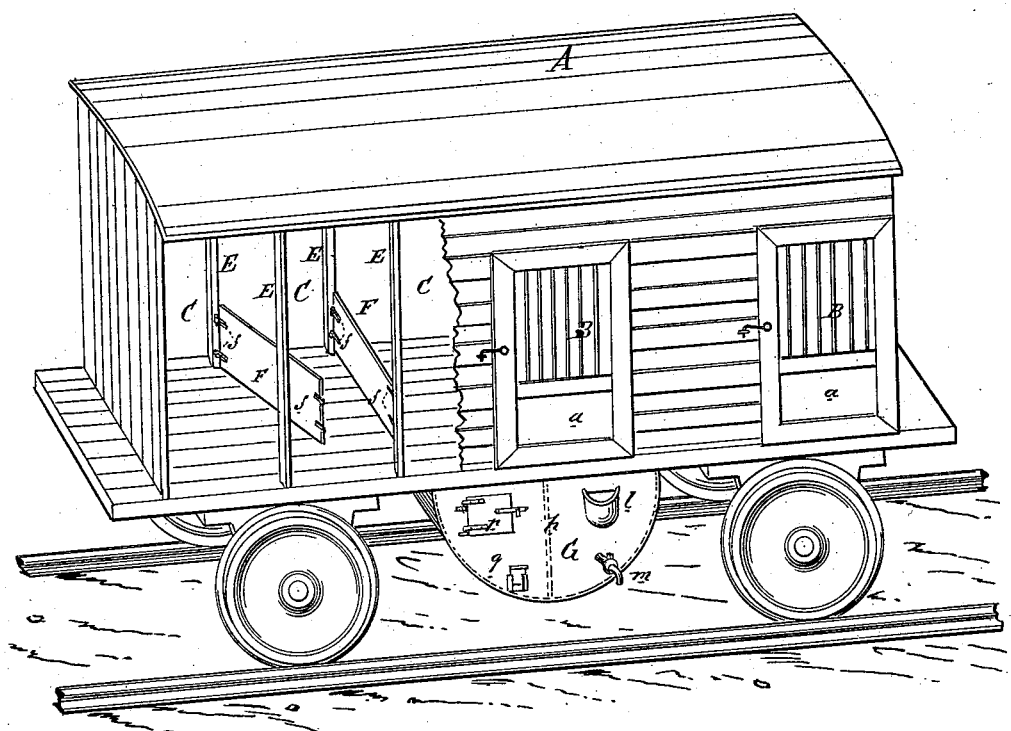
Figure 2:
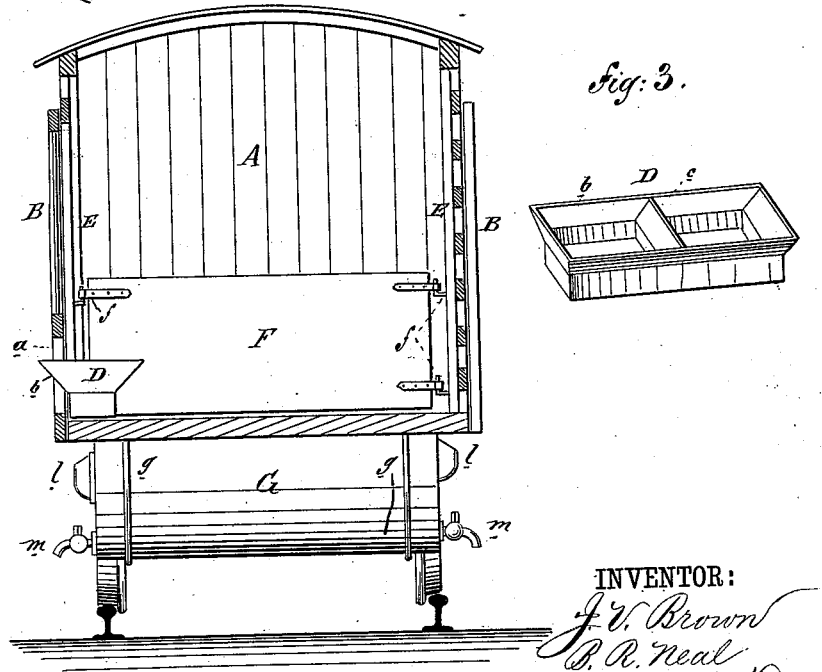
Figure 3:
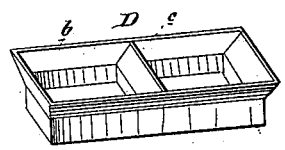

Figure 1 is a perspective view of the car with parts broken away to exhibit other parts. Fig. 2 is a sectional end elevation of the same. Fig. 3 is a perspective view of the trough.

Similar letters of reference indicate corresponding parts.

In the drawings, A represents a car provided with several doors, B B, alternating on either side, so that each door B shall open directly into a stall, C, and so that each stall C shall have a door, B, at one end thereof for the convenient ingress and egress of live stock from any one of said stalls C without interference with the occupants of another stall C, in order that the car may be loaded and unloaded more quickly than can the ordinary stock-car, and with less chance of injury to the stock. Said doors B are preferably open barred or grated in their upper portion for the purpose of ventilation and light, while their lower sections are provided with openings $a$, through and in which it is designed to place the feeding-troughs D.

Attached by either end to the upright side stanchions, E, of the car, in such a manner, as shown at $f$, that they can be readily unhinged or detached at either or both ends, are the partitions F F, that divide the car A into stalls C.

A partition, F, can be unhinged at one end and swung aside, as shown on the left in Fig. 1, thus converting two stalls C into one when it is desired, for instance, to enlarge the stall for the transportation of a valuable horse; or this throwing of two stalls C into one may be convenient when the live stock are put in or taken from the car only on one side thereof, as in such case all the stalls C may be filled or emptied from the doors B on one side of the car A, and the unhinged ends of the partitions F can then be swung to and fastened.

The trough D is of general rectangular form, with flaring edges $b$, and provided with a partition, $c$, to divide it into a food and a water receptacle. These troughs D are designed to be placed on the floor of the car A through the openings $a$ of the doors B, with a flaring edge, $b$, protruding outside of said door B for convenience of introducing feed and water; or said troughs D may be inserted through suitable openings made in the sides of the car A between the doors B.

G represents a tank suspended transversely beneath the car A by rods or straps $g\ g$, and extending from side to side thereof for convenience of removing the contents from either side of the car A. Said tank G is longitudinally divided by a partition, $h$, (shown in dotted lines in Fig. 1,) into a receptacle for water, having at each end a funnel, $l$, for the introduction of water, and a faucet, $m$, for its withdrawal, and a receptacle for food, having at each end a door, $p$, for the introduction, and a sliding door, $q$, for the withdrawal, of the food. In this tank G sufficient food and water can be carried to supply a car-load of stock for several days, and it can be easily filled and its contents removed from either end.

Having thus described our invention, we claim as new and desire to secure by Letters Patent—

1. A stock-car constructed, substantially as herein shown and described, with alternating doors B B on both sides, having trough-openings $a$, partitions F F, hinged at both ends, combined food and water tank G, suspended by rods $g\ g$ transversely beneath the car, and food and water trough D, as set forth.

2. In a stock-car, the combination, with the car A, of the trough G, suspended by rods $g\ g$, and provided with partition $h$, funnels $l$, faucets $m$, doors $p$, and sliding doors $q$, substantially as and for the purpose described.

JAMES VERNON BROWN.
BENJAMIN RUSH NEAL.

Witnesses:
L. A. MILLER,
THOS. CRAIG.